Feb. 26, 1957 E. A. STALKER 2,783,023
FLUID ROTOR HAVING DAMPING MEANS
Filed April 5, 1950
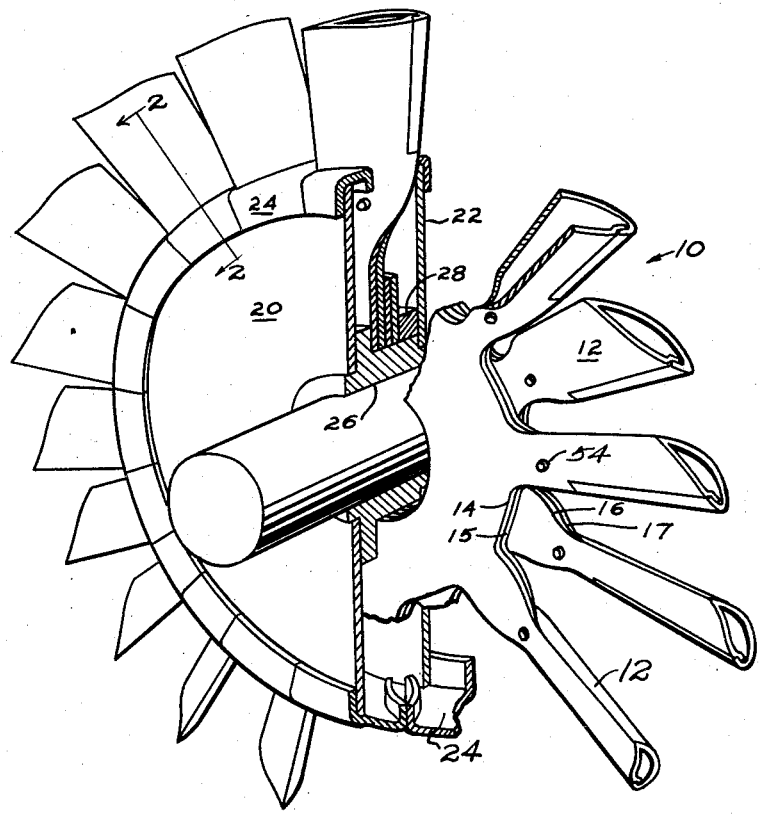
FIG. 1
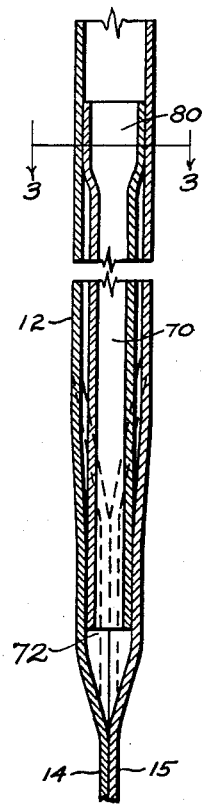
FIG. 4
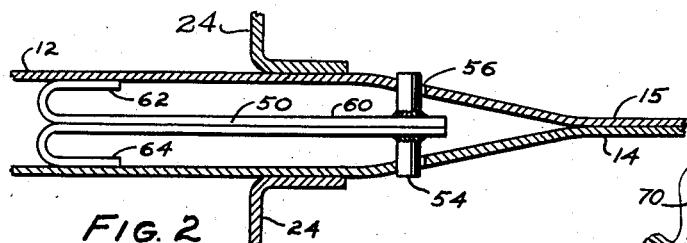
FIG. 2
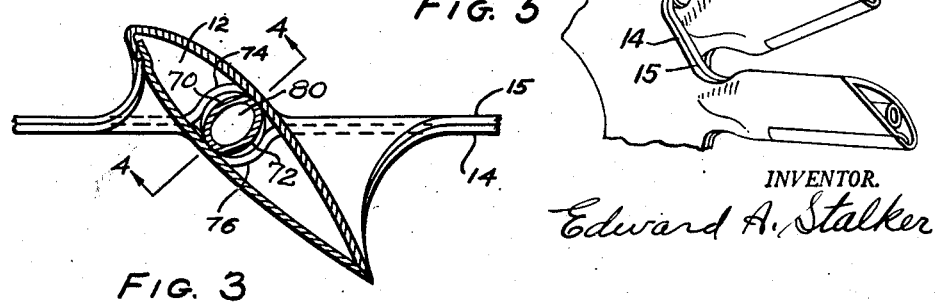
FIG. 5
FIG. 3
INVENTOR.
Edward A. Stalker United States Patent Office 2,783,023
Patented Feb. 26, 1957

2,783,023

FLUID ROTOR HAVING DAMPING MEANS

Edward A. Stalker, Bay City, Mich., assignor to The Stalker Development Company, Bay City, Mich., a corporation of Michigan Application April 5, 1950, Serial No. 154,132

9 Claims. (Cl. 253—77)

My invention relates to rotors adapted for the interchange of energy with a fluid particularly an elastitc fluid.

An object of the invention is to provide a means of damping vibrations, particularly in hollow blades.

Other objects will appear from the description, drawings and claims.

The above objects are accomplished as illustrated in the accompanying drawings in which—

Fig. 1 is a cut away perspective of a rotor according to the invention described herein;

Fig. 2 is a fragmentary radial section along the line 2—2 in Fig. 1;

Fig. 3 is a section on line 3—3 of Fig. 4 through a blade displaying another type of damper;

Fig. 4 is a fragmentary section along line 4—4 in Fig. 3, and

Fig. 5 is a view in perspective of a portion of the device of Figs. 3 and 4.

Where a hollow blade is supported on a hub structure the blade may have undesirable vibrations. These may be damped by the devices shown in Figs. 1–3.

The rotor is indicated generally as 10. It is comprised of the hollow blades 12 fixed to the central plates 14—17. The blades are supported on the hub structure comprising the side disks 20 and 22, the hub shroud segments 24, and the hub elements 26 and 28. The complete structure of blades and hub structure is bonded together preferably by furnace brazing.

The dampers 50 each comprise generally U-shaped elements with adjacent legs bearing on each other and with the opposite legs bearing against the walls of the blades. In addition, the dampers have a support shaft 54 whose opposite ends are borne or journalled in holes 56 in plates 14 and 15 (for instance) for limited angular movement. The stem 60 fixed to the shaft extends radially outward in the blade. At its outward end it has the somewhat flexible legs 62 and 64 which bear on the walls of the blade.

It will be apparent that as the damper is rotated along with the blade centrifugal force will press the arms against the blade walls, each adjacent damper leg pressing against the other. Also the centrifugal action will press the journals of the support shafts against the sides of the holes in plates 14 and 15. The friction engendered at the legs 62, 64 and at the journals will damp the vibration of the blade. The respective sizes and weights of the legs, stem and base can be adjusted to give the correct forces for damping at the proper rate of rotation.

In another form of the invention shown in Figs. 3, 4 and 5, the hollow damper stem 70 is fixed in a recess 72 formed half in each plate 14 and 15 by the beads 74 and 76. The stem is bonded to the walls of the recess. At its outer end the stem is somewhat flattened to increase its cross sectional width for a short portion 80 of the length. This portion bears on the blade walls. By properly selecting the proportions of the stem in relation to the blade the stem frequency and frictional effects will be such that the vibration of the blade will be damped.

While I have illustrated specific forms of the invention, it is to be understood that variations may be made therein and that I intend to claim my invention broadly as indicated by the appended claims.

I claim:

1. In combination in a rotor adapted for the interchange of energy with a fluid, a hub structure, a plurality of hollow blades peripherally spaced about the perimeter of said structure, a damper stem, and means adjacent the root end of the blade for supporting said stem, said stem extending radially outward within said blade and having a flexible arm extending transversely therefrom with a part extending radially inwardly to contact a side wall of said blade with increased force under the action of centrifugal force.

2. In combination in a bladed rotor, a plurality of sheet metal blade supporting plates each having a plurality of peripherally spaced blade parts, means supporting said blade plates so that said blade parts register to form a plurality of hollow blades, and a damper for said blades positioned between said plates extending radially outward within a said hollow blade and in frictional contact with the walls thereof, and means mounting said damper between said plates inwardly of said blade parts for supporting said damper against centrifugal force and for limited oscillation transverse to the rotor radius.

3. In combination in a rotor adapted for interchange of energy with a fluid, a hub structure, a plurality of hollow blades peripherally spaced about the perimeter of said structure, and a damper stem supported in said hub structure and extending radially outward within each said blade, said stem having a flexible arm extending generally transversely from said stem and bearing on a wall of said blade in frictional vibrational absorbing contact therewith.

4. In combination in a rotor adapted for the interchange of energy with a fluid, a hub structure, and a plurality of hollow blades supported on said structure and peripherally spaced thereabout and fixed thereto for direct rotary drive thereby, each said blade having opposite walls extending radially inward into said structure, a damper within each said blade having laterally extending journals supported in holes in said opposite walls for limited oscillatory motion, said damper having its radially outer part bearing on a wall of said blade in continuous contact therewith.

5. In combination in an axial flow elastic fluid rotor, a hub structure comprising a disk and a rim means enclosing said disk, a plurality of hollow blades spaced peripherally about said rim means and having blade portions extending radially outward therefrom and root portions extending radially inwardly to said disk and being fixed thereto, additional means for fixing each said blade to said rim means adapting said blade to vibrate about its root portion, a damper stem extending radially outward in said blade in rubbing frictional contact with a surface thereof to damp vibrations of said blade by friction between said surface and said stem, and means carried by said root portion of the blade for supporting the centrifugal load on said stem while allowing said vibration of said blade relative thereto.

6. In combination in an axial flow elastic fluid rotor, a hub structure comprising a disk and a rim means enclosing said disk, a plurality of hollow blades spaced peripherally about said rim means and extending radially outward therefrom, the inner ends of said blades extending radially inward through said rim means, a sheet metal element fixed to the inner end of each said blade and extending radially inward to said hub structure and being fixed thereto for supporting the centrifugal loads on said blade leaving the outer portion of the blade subject to vibration about its inner end, a damper stem fixed to and supported on said sheet metal element and extending radially outward in said blade, and friction developing means carried by the radially outer portion of said stem within the hollow interior of said blade in rubbing contact with a surface therein to damp said vibrations of said blade by friction therebetween.

7. In combination in a bladed structure adapted for exchanging force with a fluid, a plurality of hollow peripherally spaced blades supported in said structure, and a damper located in each said blade including a flexible element in frictional contact with a wall of said blade over a substantial extent thereof, said damper including another member peripherally opposite said flexible element between said flexible element and another wall of said blade for pressing said flexible element against the first said wall for frictional absorption of vibratory energy of said blade.

8. In combination in a bladed structure adapted for exchanging force with a fluid, a plurality of hollow peripherally spaced blades supported in said structure, and a damper located in each said blade comprising a plurality of U-shaped flexible elements each provided with legs and having certain of its legs bearing on each other and another said leg bearing on a wall of said blade for pressing said other leg against an adjacent wall for frictional vibrational absorbing contact therewith.

9. In combination in a rotor adapted for the interchange of energy with a fluid, a hub structure, a plurality of hollow blades peripherally spaced about the perimeter of said structure and fixed thereto against radial movement and for direct driving thereof by said structure, a damper stem positioned in a said blade, and means adjacent the root end of said blade for supporting said stem with the length thereof extending radially outwardly within said blade and subject to relative movement with respect to said blade in response to vibration of said blade, said stem having a leg radially movable relative thereto and extending transversely from said stem with a part thereof extending radially inwardly for contacting a side wall of said blade and pressing thereagainst with increased force under the action of centrifugal force on said leg.

References Cited in the file of this patent

UNITED STATES PATENTS

| | | |
|---|---|---|
| 1,530,249 | Eveleth | Mar. 17, 1925 |
| 1,833,751 | Kimball | Nov. 24, 1931 |
| 1,833,754 | Paget | Nov. 24, 1931 |
| 2,144,428 | Martin | Jan. 17, 1939 |
| 2,447,628 | Baker | Aug. 24, 1948 |
| 2,559,131 | Oestrich | July 3, 1951 |

FOREIGN PATENTS

| | | |
|---|---|---|
| 237,453 | Switzerland | Feb. 4, 1942 |
| 602,530 | Great Britain | May 28, 1948 |